(12) United States Patent
Pouchelon et al.

(10) Patent No.: US 8,557,942 B2
(45) Date of Patent: Oct. 15, 2013

(54) SINGLE-COMPONENT SILICONE ELASTOMER COMPOSITIONS CROSSLINKABLE INTO SELF-ADHESIVE STATE

(75) Inventors: Alain Pouchelon, Meyzieu (FR); Delphine Blanc-Magnard, Lyons (FR); Catherine George, Ecully (FR); Fabio Zanandrea, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 374 days.

(21) Appl. No.: 11/793,497

(22) PCT Filed: Dec. 9, 2005

(86) PCT No.: PCT/FR2005/003088
§ 371 (c)(1),
(2), (4) Date: Oct. 6, 2008

(87) PCT Pub. No.: WO2006/067294
PCT Pub. Date: Jun. 29, 2006

(65) Prior Publication Data
US 2009/0111931 A1      Apr. 30, 2009

(30) Foreign Application Priority Data
Dec. 21, 2004   (FR) ..................................... 04 13640

(51) Int. Cl.
*C08G 77/08*   (2006.01)

(52) U.S. Cl.
USPC .............................................. 528/15; 528/20

(58) Field of Classification Search
USPC ..................................................... 528/15, 20
See application file for complete search history.

(56) References Cited

U.S. PATENT DOCUMENTS

| | | | |
|---|---|---|---|
| 3,445,420 A * | 5/1969 | Kookootsedes et al. | ...... 524/862 |
| 3,775,452 A * | 11/1973 | Karstedt | ........................ 556/10 |
| 5,567,752 A | 10/1996 | Stein et al. | |
| 5,658,674 A * | 8/1997 | Lorenzetti et al. | ............ 428/447 |
| 5,696,210 A * | 12/1997 | King et al. | ..................... 525/478 |
| 6,562,180 B1 * | 5/2003 | Bohin et al. | .................... 156/329 |
| 2005/0020738 A1* | 1/2005 | Jackson et al. | .................. 524/99 |
| 2006/0128881 A1* | 6/2006 | George et al. | ................. 524/588 |

FOREIGN PATENT DOCUMENTS

| | | |
|---|---|---|
| EP | 0850996 A2 | 7/1998 |
| WO | 03/037987 A1 | 5/2003 |
| WO | WO 2004061003 A1 * | 7/2004 |

OTHER PUBLICATIONS

Sigma-Aldrich Product Specification Platinum(0)-1,3-divinyl-1,1,3,3-tetramethyldisiloxane complex solution, CAS 68478-92-2.*
Research Equipment Limited: Viscosity Chart (http://www.research-equipment.com/viscosity%20chart.html), Dec. 5, 2004, via Internet Archive Wayback Machine.*
Parbhoo et al. "Fundamental aspects of adhesion technology in silicones." Mechanics of Adhesion, 2002.*
English language translation of the Written Opinion of the International Searching Authority issued on Sep. 18, 2007 for International Patent Application No. PCT/FR2005/003088.
International Search Report issued on Apr. 13, 2006 by the European Patent Office as the International Searching Authority for International Patent Application No. PCT/FR2005/003088, and an English language translation of the Search Report.

\* cited by examiner

*Primary Examiner* — Kuo-Liang Peng
(74) *Attorney, Agent, or Firm* — Dentons US LLP

(57) ABSTRACT

Single-component silicone elastomer compositions (SEA) are crosslinkable by polyaddition into self-adhesive state, contain at least one polyorganosiloxane (POS) including sites of ethylenic and/or acetylenic unsaturation {POS containing units ≡Si—[unsaturation]}; at least one polyorganosiloxane (POS) containing units ≡Si—H; a catalytic system including at least one metal catalyst and at least one crosslinking inhibitor; a filler; at least one adhesion promoter; optionally, at least one POS resin; optionally, at least one thermal resistance agent; and, optionally, at least one other functional additive, and are useful for gluing, assembling, sealing, e.g., joints, coatings, electrical, electronic and automobile engineering parts.

13 Claims, No Drawings

SINGLE-COMPONENT SILICONE ELASTOMER COMPOSITIONS CROSSLINKABLE INTO SELF-ADHESIVE STATE

CROSS-REFERENCE TO PRIORITY/PCT APPLICATIONS

This application claims priority under 35 U.S.C. §119 of FR 0413640, filed Dec. 21, 2004, and is a continuation/national phase of PCT/FR 2005/003088, filed Dec. 9, 2005 and designating the United States (published in the French language on Jun. 29, 2006, as WO 2006/067294 A1; the title and abstract were also published in English), each hereby expressly incorporated by reference in its entirety and each assigned to the assignee hereof.

The general field of the invention is that of silicone elastomer compositions which can be vulcanized at high temperature ("Room Temperature Vulcanizing": RTV or "Liquid Silicone Rubber": LSR), by polyaddition (hydrosilylation) reactions, involving polyorganosiloxanes (POSs) bearing ≡Si—H units and POSs bearing ethylenic and/or acetylenic unsaturation(s), denoted hereinafter by POSs bearing ≡Si—[unsaturation] units, in the presence of a catalyst system comprising at least one metal catalyst (preferably based on platinum) and at least one inhibitor.

One subject of the present invention is therefore a novel single-component self-adhesive silicone elastomer adhesive (SEA) composition which can be crosslinked at high temperature by polyaddition according to high kinetics, and which has good thermal stability in the crosslinked state.

The present invention also relates to the application of this silicone elastomer adhesive (SEA) composition, in the manufacture of adhesive or in situ seals such as flowed gasket seals, profiled seals and injection-molded or overmolded seals. It may especially be an adhesive that makes it possible to join (at high temperature) various substrates, for example made of metal, glass or plastic, the substrates possibly being made of the same material or of a different material.

In these applications, it is advisable to provide a crosslinkable elastomer composition, possessing rheological properties designed so that it can be easily shaped and/or applied to the substrates to be joined and/or sealed (suitable rheology), on the one hand, and so that it is capable of retaining the shape that they are given at least during the time required for crosslinking which makes it possible to definitively set the memory of the desired shape. The crosslinkable silicone elastomer pastes in this rheological state may be described as flowing or pumpable. Such a rheological behavior is particularly welcome in adhesive bonding, in situ seal forming, molding and stamping/pad printing applications, amongst others. In the case of textile components to be adhesively bonded, this rheology makes it possible to prevent a too excessive impregnation of the fabric by the adhesive.

Still regarding adhesive bonding, but this time in particular in the electronics field (for joining electronic components), it is especially very desirable that:

the SEA adhesive has a rheology suitable for the deposition and joining operations carried out at high rates, and more specifically that it makes it especially possible to move (or handle) the joined parts before the adhesive sets (crosslinking) without this undesirably causing the joined parts to move out of line with one another;

the SEA adhesive has fast high-temperature crosslinking kinetics and is therefore compatible with the high production rates;

the SEA adhesive is thermally stable in the crosslinked state (indispensable property especially for adhesive bonding of oven doors);

the SEA adhesive is self-adhesive to the substrates to be joined; and finally this SEA adhesive is easy to handle.

On this final point, it is clear that a single-component formulation which is stable during storage is significantly better than a two-component formulation for polyaddition at high temperature, which nevertheless remains the most common one in practice. After crosslinking, the adhesive is sufficiently heat stable to be able to be applied for adhesive bonding.

To attempt to achieve these rheological characteristics, it has been proposed to use thixotropic agents that make it possible to thicken, to an exact amount, the silicone elastomer compositions, without however affecting their malleability, their fluidity required for their handling and their shaping. Among the thixotropic agents conventionally used, mention may be made of amine-based systems (polymer, preferably silicone, chain grafted with primary amine or secondary amine functional groups) or polyglycol-based systems. These conventional thixotropic agents have not made it possible to date to satisfactorily thicken all polyaddition silicone formulations and thus to open up advantageous prospects in applications for which this characteristic is essential.

It is known to thicken high-temperature vulcanizing (HTV) elastomers with peroxide, using polytetrafluoroethylene (PTFE) sold under the trademark Teflon®.

Furthermore, French Patent FR-B-2 791 994 discloses a silicone elastomer composition, which can be crosslinked by polyaddition, possessing a nonflowing rheological behavior, which is self-adhesive, and of the type of those comprising polyorganosiloxanes (POSs) bearing ≡Si—($C_2$-$C_6$) alkenyl units and ≡Si—H units, and polytetrafluoroethylene (PTFE: Teflon®) as a thixotroping agent. The targeted applications for this composition are: molding, stamping, pad printing, production of in situ seals and adhesive bonding, especially textile adhesive bonding.

This composition is advantageously in the form of a two-component composition formed by carefully mixed parts $P_1$ and $P_2$. $P_1$ contains POS resin of structure $MM^{Vi}DD^{Vi}Q$ made of: $(CH_3)_3SiO_{0.5}$ (M units), $(CH_3)_2ViSiO_{0.5}$ ($M^{Vi}$ units), $(CH_3)_2SiO$ (D units) and $SiO_2$ (Q units); a POS: polydimethylsiloxane having $(CH_3)_2ViSiO_{0.5}$ units, a diatomaceous earth filler (CELITE® 350), magnesium oxide powder, butyl orthotitanate which is one of the three components of an adhesion promoter, a platinum metal catalyst in the form of a metal complex, known under the name of Karstedt catalyst. Another filler formed from a powdery mixture based on Teflon (DuPont, Resin T CN®) and on 50 ground quartz (SIFRACO C-600). $P_2$ has the same composition as $P_1$, with the exception of the catalyst and in addition comprises a poly(dimethyl)-(methylhydro)siloxane, blocked by $(CH_3)_2HSiO_{0.5}$ units, 2nd and 3rd components of the adhesion promoter, respectively: vinyltrimethoxysilane (VTMO) and glycidoxypropyltrimethoxysilane (GLYMO) and an inhibiter based on ethynylcyclohexanol. Once the parts $P_1$ and $P_2$ are mixed, the stability of this low-temperature two-component composition in the ambient atmosphere is limited to a few days.

In such a prior art, one of the main objectives of the present invention is to provide a silicone elastomer adhesive (SEA) composition which is self-adhesive, can be crosslinked at high temperature by polyaddition, has rheological behavior that is high-performance and suitable for industrial production rates especially as regards adhesive bonding, is thermally stable, easy to handle and which is especially in the form of a single-component formulation.

Another main objective of the invention is to provide a single-component self-adhesive SEA composition which is capable of crosslinking rapidly at high temperature by polyaddition and which is stable at ambient temperature for long periods (e.g. several weeks to several months).

Another main objective of the invention is to provide a silicone elastomer adhesive (SEA) composition, of polyaddition type, which is in particular self-adhesive and which can be obtained simply and economically.

Another main objective of the present invention is to provide a method for applying a silicone elastomer adhesive (SEA) composition, which can be crosslinked by polyaddition, and is in particular self-adhesive, in the adhesive bonding, for example other than of electronic components, of fibrous materials e.g. textiles, especially in automobile trim.

Another main objective of the present invention is to provide a method of applying a silicone elastomer adhesive (SEA) composition, which can be crosslinked at high temperature and which is in particular self-adhesive, in the manufacture of in situ seals such as flowed gasket seals, profiled seals and injection-molded or overmolded seals.

Another main objective of the present invention is to provide an adhesive comprising the silicon elastomer adhesive (SEA), which is in particular self-adhesive.

These objectives, amongst others, are achieved by the present invention which firstly relates to a silicone elastomer adhesive composition which can be crosslinked at high temperature by polyaddition (hydrosilylation), this composition being of the type of those comprising:
α/at least one polyorganosiloxane (POS) bearing one or more ethylenically and/or acetylenically unsaturated groups, {POS having ≡Si— [unsaturation] units};
β/at least one polyorganosiloxane (POS) bearing ≡Si—H units;
γ/a catalyst system comprising:
    γ.1 at least one metal catalyst (preferably based on platinum); and
    γ.2 at least one crosslinking inhibitor;
δ/a filler;
ε/at least one adhesion promoter;
ρ/optionally at least one POS resin;
λ/optionally at least one heat stabilizer; and
φ/optionally at least one other functional additive;
characterized in that it is a single-component composition and in that the crosslinking inhibitor γ.2 is chosen from the group of α-acetylenic alcohols.

According to one preferred embodiment, the crosslinking inhibitor γ.2 corresponds to the formula:

R—(R')C(OH)—C≡CH  (I)

in which formula:
R is a linear or branched alkyl radical, or an aryl radical for example a phenyl radical; and
R' is H or a linear or branched alkyl radical, or an aryl radical for example a phenyl radical;
the R, R' radicals and the carbon atom located at the α position of the triple bond being optionally able to form a ring;
the total number of carbon atoms contained in R and R' being at least 4, preferably at least 9 and even more preferably lying in the range going from 9 to 20.

According to one more preferred embodiment, the crosslinking inhibitor γ.2 corresponds to the aforementioned formula (I) in which:
R is a linear or branched alkyl radical, or a phenyl radical;
R' is H or a linear or branched alkyl radical, or a phenyl radical;
the total number of carbon atoms contained in R and R' lying in the range going from 9 to 20.

According to one still more preferred embodiment, the crosslinking inhibitor γ.2 is chosen from the α-acetylenic alcohols having a boiling point above 250° C.

According to one most especially preferred embodiment, the crosslinking inhibitor γ.2 is chosen from the following α-acetylenic alcohols:
3-methyl-1-dodecyn-3-ol;
3,7,11-trimethyl-1-dodecyn-3-ol;
1,1-diphenyl-2-propyn-3-ol;
3-ethyl-6-ethyl-1-nonyn-3-ol; and
3-methyl-1-pentadecyn-3-ol.

These α-acetylenic alcohols are commercial products.

It is to the credit of the Inventors to have made this selection of specific inhibitors from the huge family of hydrosilylation reaction inhibitors. This inventive method gives access to SEAs of RTV or LSR type, which have the great advantage of being single-component formulations which are stable during storage and which have rheological behavior that is high-performance and suitable for industrial production rates, especially as regards adhesive bonding, which are easy to handle and which finally are economical.

The SEA compositions according to the invention are able to be used for joining purposes and/or to ensure the protection of joined components.

Without this being limiting, it should be pointed out that the high-temperature crosslinking of the SEA composition according to the invention is understood to be at a temperature for example between 50 and 200° C., preferably between 80 and 150° C., in an ambient atmosphere.

There is naturally a time/temperature compromise that a person skilled in the art will be able to determine easily according to the formulation in question.

As regards the molar ratios of the metal of the catalyst to the inhibitor, they may be between 1/50 and 1/1000, preferably between 1/100 and 1/500.

The γ.1 catalysts advantageously used in the catalyst system γ of the composition according to the invention comprise all the catalysts used for the hydrosilylation of POSs bearing ≡Si—H units and of POSs bearing ≡Si— [ethylenic or acetylenic unsaturation] units. They can therefore be platinum, rhodium, iridium, nickel, ruthenium and/or palladium compounds. They are more particularly iridium compounds or better still platinum compounds.

The platinum compound may be any complex of platinum and an organic product, e.g. those described in U.S. Pat. Nos. 3,159,601, 3,159,602, 3,220,972 and European Patents EP-A-0 057 459, EP-A-0 188 978 and EP-A-0 190 530, or any complex of platinum and vinyl-containing organosiloxanes, e.g. those described in U.S. Pat. Nos. 3,419,593, 3,715,334, 3,377,432 and 3,814,730.

Mention may be made of chloroplatinic acid, a chloroplatinic acid modified by an alcohol, or else a complex of chloroplatinic acid with an olefin, an aldehyde or a vinylsiloxane amongst others. U.S. Pat. No. 2,823,218 discloses a hydrosilylation catalyst of the chloroplatinic acid type and U.S. Pat. No. 3,419,593 relates to catalysts formed by complexes of chloroplatinic acid and an organosilicone of vinylsiloxane type. Complexes of platinum and hydrocarbons used as hydrosilylation catalysts are disclosed in U.S. Pat. Nos. 3,159,601 and 3,159,602. U.S. Pat. No. 3,723,497 describes a platinum acetylacetonate and the subject of U.S. Pat. No. 3,220,972 is catalysts based on platinum alcoholate.

The γ.1 catalysts more especially chosen according to the invention are platinum/unsaturated siloxane complexes, in particular platinum/vinylsiloxane complexes, especially those obtained by reaction of a platinum halide and an unsaturated organosilicon material such as an unsaturated silane or an unsaturated siloxane, e.g. according to the teaching of U.S. Pat. No. 3,775,452 to which a person skilled in the art may refer. The invention preferably applies to the Karstedt solution or complex described above.

According to one particular method of the invention, it is possible to add, to the composition comprising the α and β POSs and the catalyst system according to the invention, another crosslinking inhibitor, for example a compound of maleate type (U.S. Pat. No. 4,256,870 and U.S. Pat. No. 4,530,989) or a compound of acetylene dicarboxylate type (U.S. Pat. Nos. 4,504,645 and 4,347,346).

The catalyst system γ according to the invention may be simply mixed with the α POS or with the β POS, or with the mixture of α and β POSs, before or after addition to the other ingredients.

In addition to this carefully selected catalyst system, the composition according to the invention also comprises α and β POSs, which may advantageously be chosen from the following species:

the α POS or POSs comprising siloxyl units of formula:

$$R^1_n SiO_{4-n/2} \quad (II)$$

and siloxyl units of formula:

$$Z_x R^1_y SiO_{4-x-y/2} \quad (III)$$

the β POS or POSs comprising siloxyl units of formula:

$$R^1_n SiO_{4-n/2} \quad (IV)$$

and siloxyl units of formula:

$$HR^1_w SiO_{4-w/2} \quad (V)$$

in which formulae the various symbols have the following meanings:
- the $R^1$ symbols, being identical or different, each represent a nonhydrolysable hydrocarbon-based type group, this radical possibly being:
  an alkyl radical having 1 to 5 carbon atoms and possibly comprising 1 to 6 chlorine atoms;
  cycloalkyl radicals having 3 to 8 carbon atoms and possibly comprising 1 to 4 chlorine atoms;
  aryl or alkylaryl radicals having 6 to 8 carbon atoms and possibly comprising 1 to 4 chlorine atoms;
  cyanoalkyl radicals having 3 to 4 carbon atoms; methyl, ethyl, propyl, isopropyl, butyl, isobutyl, n-pentyl, t-butyl, chloromethyl, dichloromethyl, α-chloroethyl, α,β-dichloroethyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, and xylyl, such as 2,3-dimethylphenyl or 3,4-dimethylphenyl, groups being preferred; methyl and phenyl radicals being particularly preferred;
- the Z symbols represent a $C_2$-$C_6$ (preferably vinyl) alkenyl group;
- n=an integer equal to 0, 1, 2 or 3;
- x=an integer equal to 0, 1, 2 or 3;
- y=an integer equal to 0, 1 or 2;
- the sum x+y lies within the range going from 1 to 3; and
- w=an integer equal to 0, 1, 2 or 3.

The nature of the polyorganosiloxane and therefore the ratios of the siloxyl units (II) to the siloxyl units (III) and the distribution of both of these are, as is known, chosen according to the crosslinking treatment that will be carried out on the curable composition for the purpose of converting it to an elastomer.

As examples of siloxyl units of formula (III) forming the POS, mention may be made of: vinyldimethylsiloxyl, vinylphenylmethylsiloxyl, vinylmethylsiloxyl and vinylsiloxyl.

The dimethylsiloxyl, methylphenylsiloyl, diphenylsiloxyl, methylsiloxyl and phenylsiloxyl units are examples of siloxyl units of formula (II) of the POS.

POS examples are linear and cyclic compounds such as:
dimethylvinylsilyl-terminated dimethylpoly-siloxanes;
trimethylsilyl-terminated (methylvinyl)(dimethyl)polysiloxane copolymers;
dimethylvinylsilyl-terminated (methylvinyl) (dimethyl) polysiloxane copolymers; or
cyclic methylvinylpolysiloxanes.

The polyorganosiloxane compositions according to the invention are single-component compositions which are stable for a very long time at low temperatures. They crosslink only with heat (50-200° C., preferably 80-150° C.) by polyaddition reactions, mainly by reaction of hydrosilyl groups with alkenylsilyl groups.

The polyorganosiloxanes incorporated into these compositions are generally composed of pairs based, on the one hand, on a linear, branched or crosslinked polysiloxane composed of (III) units in which the Z residue represents a $C_2$-$C_6$ (preferably vinyl) alkenyl group, and where x is at least equal to 1, optionally combined with (II) units, and on the other hand, on a linear, branched or crosslinked ≡SiH hydropolysiloxane POS composed of (III) units in which the Z residue then represents a hydrogen atom and where x is at least equal to 1, optionally combined with (II) units.

Regarding the polyorganohydrosiloxane β, it is advantageously chosen from linear, cyclic or network homopolymers and copolymers having on average, per molecule, preferably at least three hydrogen atoms linked to different silicon atoms and of which the organic radicals linked to the silicon atoms are chosen from methyl or ethyl radicals; 60 mol % at least of these radicals (and preferably all of these radicals) being methyl radicals.

According to one advantageous arrangement, the POS (β) is used in an amount such that the molar ratio of the hydride functional groups of the POS (β) to the vinyl groups of the POS (α) is between 1.1 and 4.

Examples of siloxyl units forming the POS (β) are $H(CH_3)2SiO_{1/2}$ or $H(CH_3)SiO_{2/2}$ or $H(C_6H_5)SiO_{2/2}$.

As examples of POS (β), mention may be made of:
hydrodimethylsilyl-terminated dimethylpolysiloxanes ends;
copolymers having trimethysilyl-terminated (dimethyl) (hydromethyl)-polysiloxane units;
copolymers having hydrodimethylsilyl-terminated (dimethyl)(hydromethyl)polysiloxane units;
trimethylsilyl-terminated (hydromethyl)polysiloxanes; and
cyclic (hydromethyl)polysiloxanes.

These (α) and (β) POSs are for example respectively a polyorganovinylsiloxane and a polyorganohydrosiloxane. The organic substituents other than the vinyl and hydrogen reactive groups are, for example, methyl or cyclohexyl groups. The hydrogen and vinyl groups are borne by siloxyl units $M=[R_3SiO—]$ and/or $D=[—(R)_2SiO—]$ and/or $T=[—(R)SiO—]$.

These hydrogen-containing or vinyl-containing units M or D each respectively comprise one or more H or vinyl groups, preferably just one.

The number of ≡SiH or ≡SiVi units per molecule is preferably greater than or equal to 2. This can especially represent from 0.01% to 10% (preferably 0.1 to 2%) of vinyl by weight for the α POS and from 0.001% to 5% (preferably 0.05 to 2%) of hydrogen by weight for the β POS.

Suitable β POSs are:
Si(CH₃)₃-terminated polymethylhydrosiloxanes;
Si(CH₃)₂H-terminated polydimethylsiloxanes;
Si(CH₃)₂H-terminated methylhydrodimethylsiloxanecopolymers;
methylhydromethyloctylsiloxane copolymers; and
methylhydrocyclosiloxane polymers.

In general, the α and β POSs have an average molecular weight between $1\times10^2$ and $1\times10^7$ (g/mol).

The compositions according to the invention may be of RTV or LSR type. By way of indication, the crosslinkable RTV silicone elastomer compositions have a viscosity $\eta_{RTV}$ at 25° C. such that $\eta_{RTV} \leq 100{,}000$ mPa·s and the crosslinkable LSR silicone elastomer compositions have a viscosity $\eta_{LSR}$ such that:

$$100{,}000 \leq \eta_{LSR} \leq 2{,}000{,}000 \text{ mPa·s}$$

Regarding the polyaddition POSs used in the compositions according to the invention (α POS—even ρ POS), several classes thereof are distinguished which differ in their viscosity and which define RTV or LSR type polyaddition silicone elastomer compositions.

In the case of RTV compositions that crosslink by polyaddition reactions, the α and/or ρ POS polyorganosiloxane constituent or constituents are chosen from those bearing alkenylsilyl groups, which advantageously have a viscosity η at 25° C.:

where $200 \leq \eta \leq 200{,}000$ mPa·s preferably $500 \leq \eta \leq 100{,}000$ mPa·s.

In the case of LSR compositions that crosslink by polyaddition reactions, the α and/or β POS or POSs bearing alkenylsilyl groups have, for example, a viscosity η' at 25° C.:

$10{,}000 \leq \eta' \leq 500{,}000$ mPa·s.

In the case of RTV or LSR polyorganosiloxane compositions, the β polysiloxane constituent or constituents bearing hydrosilyl groups generally have a viscosity at 25° C. at most equal to 10,000 mPa·s and preferably between 5 and 1000 mPa·s.

All the viscosities in question in the present text correspond to a dynamic viscosity value at 25° C. measured, in a way known per se, at a shear rate gradient that is representative of its use.

According to one variant, it can be envisaged that the composition according to the invention comprises mixtures of POSs that differ in their nature and/or in their viscosity.

More specifically, the composition according to the invention comprises:
α—at least one POS having, per molecule, at least two $C_2$-$C_6$ alkenyl groups linked to the silicon;
β—at least one POS having, per molecule, at least two hydrogen atoms linked to the silicon;
γ—a catalyst system as defined above;
ε/a preferably binary adhesion promoter, and even more preferably consisting of:
  ε.1 at least one alkoxylated organosilane containing, per molecule, at least one $C_2$-$C_6$ alkenyl group;
  ε.2 at least one organosilicon compound comprising at least one epoxy radical;
δ/a filler:
  δ.1 that is a reinforcing filler;
  δ.2 that is a nonreinforcing (semireinforcing) or bulking filler; or
  δ.3 that is a microsphere filler;
ρ/optionally at least one POS resin bearing T and/or Q, optionally M and/or D siloxyl units and alkenyl-containing siloxyl units—preferably vinyl-containing siloxyl units of $M^{Vi}$ and/or $D^{Vi}$ type—resins of $MM^{Vi}DD^{Vi}$ type being most particularly preferred;
λ/optionally at least one heat stabilizer additive; and
φ/optionally at least one other functional additive.

The reinforcing filler δ.1 may be chosen from mineral, in particular siliceous materials.

The siliceous reinforcing fillers are chosen from colloidal silicas, fumed silica powders, precipitated silica powders or their mixtures. These powders have an average particle size generally of less than 0.1 μm and a BET specific surface area of greater than 50 m²/g, preferably between 50 and 400 m²/g, especially between 90 and 350 m²/g.

The nonreinforcing or semireinforcing (bulking) filler δ.2 is advantageously used in addition to the reinforcing filler δ.1. This filler δ.2 may also be chosen from the group of mineral materials comprising, amongst others, semireinforcing siliceous fillers, such as diatomaceous earths or ground quartz.

δ.2 may also be a nonsiliceous mineral material. Examples of nonsiliceous fillers that can be used alone or as a mixture are carbon black, titanium dioxide, magnesium oxide, aluminum oxide, hydrated alumina, expanded vermiculite, unexpanded vermiculite, calcium carbonate, zinc oxide, mica, talc, iron oxide, barium sulphate, slaked lime, diatomaceous earths, ground quartz and ground zirconia. These nonsiliceous fillers have a particle size generally between 0.001 and 300 μm and a BET surface area of less than 100 m²/g.

Practically, but nonlimitingly, the fillers used may be a mixture of quartz and silica.

The fillers may be pretreated by any suitable product, e.g. by chlorosilanes, cyclosiloxanes or hexamethyldisilazane (HMDZ) or by other organosilicon compounds normally used for this purpose, such as organochlorosilanes, diorganocyclopolysiloxanes, hexaorganodisiloxanes, hexorganodisilazanes or diorganocyclopolysilazanes (French Patents FR-A-1 126 884, FR-A-1 136 885, FR-A-1 236 505, and British Patent GB-A-1 024 234).

Thus, the siliceous reinforcing filler δ.1 may for example be treated in situ by a "compatibilizing" agent, preferably of HMDZ type, in the presence of the POS (α).

The expression "in situ treatment of the siliceous filler" is understood to mean that the filler and the compatabilizing agent are brought together with at least one portion of polyorganosiloxane (α) silicone oil. In a particularly preferred manner, this mainly consists in introducing the compatibilizing agent (CA) into the preparation medium in two steps:
on the one hand, before and/or approximately at the same time as at least one part of the silicone oil used is brought together with at least one portion of the siliceous filler used, this introduction of CA (portion 1) being carried out on one or more occasions and corresponding to a proportion of less than or equal to 8%, preferably less than or equal to 5% and even more preferably less than or equal to 3% by dry weight relative to the total filler; and
on the other hand (portion 2), after the silicone oil and filler are brought together.

The compatibilizing agent of portion (1) is thus chosen from molecules which satisfy at least two criteria:
having a strong interaction with the silica (hydrogen bonds) and with the surrounding silicone oil;

being, themselves or their degradation products, easily removed from the final mixture by heating under vacuum or under a gas stream.

Low molecular weight compounds are therefore preferred. The agent of portion (1) could be for example:

- a silazane, preferably a disilazane, or mixtures thereof, hexamethyldisilazane (HMDZ) being preferred and possibly being combined with divinyltetramethyldisilazane;
- a difunctional or preferably monofunctional hydroxylated siloxane;
- an amine such as ammonia or a low molecular weight alkylamine such as diethylamine; or
- a low molecular weight organic acid such as formic or acetic acids.

This agent of portion (1) is preferably used in the presence of water.

The compatabilizing agents of portion (2) may be chosen from various silazanes and disilazanes encountered above, taken alone or as mixtures with one another, preferably from disilazanes, hexamethyldisilazane in combination or not with divinyltetramethyldisilazane being particularly preferred.

This in situ treatment of silica by HMDZ is described in detail in Patent Application WO-A-98/58997, which is incorporated in its entirety in the present text by reference. In the case where such treatment leads to a basic pH, it is possible to add, to the dispersion, a neutralizing agent (H) such as, for example, a weak acid (e.g. acetic or phosphoric acid) or a silica filler such as ground quartz.

The filler $\delta.3$ may also be a microsphere filler, that is to say preferably composed of expandable organic microspheres comprising, as is known per se, a polymer wall containing a liquid or a gas. These microspheres can be expanded by heating them beyond the softening point of the polymer and at a sufficient temperature to vaporize the liquid or to suitably expand the gas, which may be, for example, an alkane such as isobutane or isopentane. The wall may consist, as is known per se, of polymers or copolymers, for example prepared from vinyl chloride, vinylidene chloride, acrylonitrile, methyl methacrylate or styrene monomers or blends of polymers and/or copolymers, for example especially acrylonitrile/methacrylonitrile copolymers or acrylonitrile/vinylidene chloride copolymer. See especially U.S. Pat. No. 3,615,972.

They can be incorporated into the composition either in the expanded state or before their expansion, which can be induced by appropriate heating during crosslinking of the composition.

Before their expansion, the microspheres will preferably have a diameter between 3 and 50 μm, more particularly between 5 and 30 μm.

It will also be desired to have a diameter after expansion (in situ or to begin with) that is especially between 10 and 150, in particular between 20 and 100 μm.

These fillers could be present in an amount of:

- 5 to 30%, preferably 15 to 25% relative to the total composition minus the microspheres, for the reinforcing fillers $\delta.1$;
- 5 to 40%, preferably 10 to 30%, preferably 2 to 10% and even more preferably from 3 or 4% by weight relative to the total composition for semireinforcing or bulking fillers $\delta.2$; and
- 1 to 30% by weight, preferably 2 to 10% and even more preferably 3 to 4% by weight relative to the total composition for the microsphere filler $\delta.3$.

More generally, on a quantitative level, the compositions according to the invention reflect the standard proportions in the technical field in question, knowing that the intended application must also be taken into account.

The resin ($\rho$) bears alkenyl-containing siloxyl units, preferably vinyl-containing siloxyl units of $M^{Vi}$ and $D^{Vi}$ type. The organic substituents of the M, D and T siloxyl units of these resins are, for example, methyl, isopropyl, tert-butyl, n-hexyl or phenyl radicals. These silicone resins are well-known branched POSs, whose preparation methods are described in a great many patents.

As examples of resins that can be used, mention may be made of MQ, MDQ, TD and MDT resins. More specifically, they can in practice be a resin of M $M^{Vi}DD^{Vi}Q$ type. These resins ($\rho$) may be solid or liquid at room temperature. They may be in solution in an organic solvent or a silicone oil.

It should be noted that the use of a resin ($\rho$) is compulsory when the filler $\delta$ does not include a reinforcing filler $\delta.1$.

The adhesion promoter $\epsilon$, preferably comprises:

$\epsilon.1$ at least one alkoxylated organosilane containing, per molecule, at least one $C_2$-$C_6$ alkenyl group; and $\epsilon.2$ at least one organosilicon compound comprising at least one epoxy radical.

The alkoxylated organosilane ($\epsilon.1$) of the promoter ($\epsilon$) is more particularly chosen from the products of the following general formula:

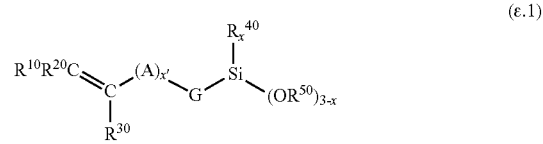

(ε.1)

in which:

$R^{10}$, $R^{20}$ and $R^{30}$ are hydrogen or hydrocarbon radicals that are identical to or different from one another and preferably represent hydrogen, a linear or branched $C_1$-$C_4$ alkyl group or a phenyl group optionally substituted by at least one $C_1$-$C_3$ alkyl group;

A is a linear or branched $C_1$-$C_4$ alkylene group;

G is a valency bond or oxygen;

$R^{40}$ and $R^{50}$ are identical or different radicals and represent a linear or branched $C_1$-$C_4$ alkyl group;

x'=0 or 1; and x=0 to 2, preferably 0 or 1 and even more preferably 0.

Without this being limiting, it may be considered that the vinyltrimethoxysilane (VTMO) is a particularly suitable compound ($\epsilon.1$).

Regarding the organosilicon compound ($\epsilon.2$) it is designed according to the invention to be chosen:

either from the products ($\epsilon.2a$) corresponding to the following general formula:

(ε.2a)

in which:

$R^{60}$ is a linear or branched $C_1$-$C_4$ alkyl radical;

$R^{70}$ is a linear or branched alkyl radical; and y is equal to 0, 1, 2 or 3, preferably to 0 or 1, and even more preferably to 0,

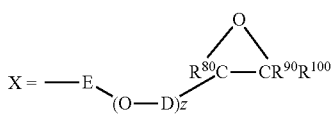

with:
- E and D which are identical or different radicals chosen from linear or branched $C_1$-$C_4$ alkyl radicals;
- z which is equal to 0 or 1;
- $R^{80}$, $R^{90}$ and $R^{100}$ which are identical or different radicals representing hydrogen or a linear or branched $C_1$-$C_4$ alkyl radical, hydrogen being more particularly preferred; and
- $R^{80}$ and $R^{90}$ or $R^{100}$ may possibly alternatively form, together with the two carbons bearing the epoxy, an alkyl ring having 5 to 7 ring members;

or from the products (ε.2b) composed of epoxyfunctional polydiorganosiloxanes comprising at least one unit of formula:

$$X_p G_q SiO \quad (\epsilon.2\,b1)$$

in which:
- X is the radical as defined above for the formula (ε.2a);
- G is a monovalent hydrocarbon group, which has no unfavorable effect on the activity of the catalyst and which is preferably chosen from alkyl groups having 1 to 8 carbon atoms inclusive, optionally substituted with at least one halogen atom, advantageously from methyl, ethyl, propyl and 3,3,3-trifluoropropyl groups and also from aryl groups and advantageously from xylyl and tolyl and phenyl radicals;
- p=1 or 2,
- q=0, 1 or 2; and
- p+q=1, 2 or 3, optionally at least some of the other units of these polydiorganosiloxanes are units of average formula:

$$G_r SiO \quad (\epsilon.2\,b2)$$

in which G has the same meaning as above and r has a value between 0 and 3, for example between 1 and 3.

The compounds (ε.2) are therefore preferentially epoxyalkoxysilicon compounds and even more preferably epoxyalkoxymonosilanes (ε.2a). As examples of such compounds (ε.2), mention may be made of:
- 3-glycidoxypropyltrimethoxysilane (GLYMO),
- or 3,4-epoxycyclohexylethyltrimethoxysilane.

According to the invention, an advantageous combination to form the adhesion promoter is the following:

VTMO/GLYMO

Quantitatively, it may be specified that the weight proportions of (ε.1) and (ε.2), expressed as percentages by weight relative to the total of the two, are the following:
- (ε.1)≥10, preferably between 15 and 70 and even more preferably 25 to 65; and
- (ε.2)≤90, preferably between 70 and 15 and even more preferably 65 to 25, being understood that the sum of these proportions in (ε.1) and (ε.2) is equal to 100%.

It should be noted that in the case where the composition comprises an extender φ, then the alkoxylated organosiloxane ε.1 preferably comprises at least one $C_3$-$C_6$ alkenyl group.

The optional agent λ for heat stability (in the crosslinked state) may be, for example, chosen from the group comprising: $TiO_2$ (preferably particles of predominantly anatase or predominantly rutile polycrystalline structure, optionally surface treated and especially described in French patent application FR 98/03396), iron or cerium oxides, metal salts of organic acids, e.g. iron or cerium salts, for example iron or cerium octoate, and carbon black.

The silicone compositions of the invention may, in addition, comprise conventional functional additives φ.

As families of conventional functional additives φ, mention may be made of:
- extenders composed of at least one α, ω ≡SiH POS;
- hydroxylated POS oils used as compatabilizing agent;
- neutralizing agents;
- colorants;
- adhesion modifiers;
- heat stabilizers;
- additives for enhancing the consistency and
- additives for stability toward heat, oil or fire (for example metal oxides).

The optional POS extender φ may be a POS having end siloxyl units of type: $HR^o{}_2SiO_{1/2}$, with $R^o$ being identical to or different from one another and corresponding to a linear or branched $C_1$-$C_6$ alkyl group and/or a substituted or unsubstituted aryl group, $R^o$ preferably being $CH_3$. In addition to these end units, this POS (φ) is, furthermore, a polydiorganosiloxane, preferably a polydimethylsiloxane. As examples of POS (φ), mention may be made of α,ω-(dimethylsiloxy)poly(dimethyl hydrosiloxy) siloxane.

Regarding the preparation of the composition, it may be carried out in the manner known to a person skilled in the art. It is however preferable to add the crosslinking inhibitor γ.2 and also the metal catalyst γ.1 at the end of the preparation of the composition and while operating at ambient temperature (23° C.).

The present invention also covers a whole range of applications of the silicone elastomer adhesive (SEA) composition as defined above which can be crosslinked by polyaddition and to which a platinum/α-acetylenic alcohol-based inhibitor catalyst system has been added.

The compositions according to the invention may be used for multiple applications, such as joining the most diverse materials (metals, plastics, glass and ceramics, electronic components) or sealing in various fields of industry (motor vehicle and transport, domestic electrical appliances, electrical engineering or electronics) or else in the protection of joined components.

With regard to sealing, the compositions are more especially suitable for the formation of "in situ" seals used in industry. These "in situ" seals encompass several types, namely "flowed gasket" seals also known as crushed seals, profiled seals (PS) also known as shaped seals and finally injection-molded (or overmolded) seals.

The "flowed gasket" seals relate, in the automobile industry, to assemblies that do not commonly have to be disassembled, such as for example sealing of engines (cylinder block, front cylinder head plate) and transmissions. In the field of domestic electrical appliances, mention may be made of the assembly of oven plates, the assembly of glass-ceramic hobs and the assembly of irons.

The "profiled" seals (PS) are used in the transport and automobile industry for sealing applications for all engine components requiring the ability to be dismantled such as for example, the cylinder head cover, oil pump, water pump, radiator tank, oil sump, timing cover or clutch guide.

The materials forming these components and to which the SEAs according to the invention adhere perfectly may be for example glass, stainless steel, electronic components, cast iron, aluminum, galvanized sheet, electrogalvanized sheet, cataphoretically painted sheet, polyamides or phenoplast resins.

In the field of domestic electrical appliances, various applications of the SEAs according to the invention may be mentioned:
- doors for electric or gas ovens;
- doors for microwave or hybrid ovens;
- glass-ceramic plates;
- components of irons; and
- washing-machine drums.

The applications of SEAs according to the invention that may be envisioned in the electrical engineering and electronics industries are:
- coverings for electrical or electronic housings, or printed circuits;
- electronic boards.

Regarding assembly, and apart from the assembly of components by flowed gasket seals as described above, mention may be made of surface adhesive bonding applications such as the adhesive bonding of fabrics for example to seats automobile trim—(transport sector). The SEAs according to the invention are particularly suitable for this application due to their good ranking with regard to fire/smoke safety regulations, due to their good level of thixotropy which prevents impregnation of the product before crosslinking followed by "staining" of the fabric and finally due to their good level of adhesion to the supports forming the seat (steel, stainless steel, polyester, ABS, polycarbonate, velour, etc.).

The single-component SEAs according to the invention also allow bonding of various support components made of glass, stainless steel and polyamide.

Thus, SEA compositions according to the invention may be used, as an adhesive for assembling at least two components. Such an application method is characterized in that it mainly consists in coating at least one of the components to be assembled with a layer of composition according to the invention, in assembling said components by applying them to one another, and in crosslinking the elastomeric adhesive, preferably by heating.

According to one advantageous arrangement of the invention, the components to be assembled are two in number.

According to another application method, one of the components to be assembled is a woven, knitted or nonwoven fibrous material based on conventional natural and/or synthetic fibers. This may be, for example, an application in the adhesive bonding of fibrous materials, e.g. textile materials, especially in the context of the automobile trim sector.

It therefore appears that the fields of application of the single-component polyaddition SEA which can be crosslinked at high temperature according to the invention are mainly adhesive bonding, assemblies, sealed joints, coatings, protection and potting, in an efficient and safe manner, in the domestic electrical appliance, electrical engineering, electronics and automotive sectors.

The present invention finally relates to an adhesive, characterized in that it comprises the single-component SEA composition according to the invention.

The present invention will be better understood in the light of the example that follows.

EXAMPLE

A/SEA Formulation

POS α.1: polydimethylsiloxane PDMS blocked with $(CH_3)_2ViSiO_{0.5}$ units having a viscosity of around 100 Pa·s and containing around 0.0022 SiVi functional groups per 100 g of oil;

POS β: poly(dimethyl)(hydromethyl)siloxane, blocked with $(CH_3)_2HSiO$ 0.5 having a viscosity of around 25 mPa·s and containing in total around 0.7 SiH functional groups per 100 g of oil;

catalyst system γ:
- γ.1: platinum metal in the form of a metal complex, known under the name of Karstedt catalyst in solution in a vinyl-containing PDMS oil comprising 10 wt % of metal platinum;
- γ.2: 3,7,11-trimethyl-1-dodecyn-3-ol (TMDDO);

resin ρ: resin of structure $MM^{Vi}DD^{Vi}Q$ containing by weight around 0.6% of vinyl groups (Vi) and composed of, by weight, around 17% of $(CH_3)_3SiO_{0.5}$ (M units), 0.5% of $(CH_3)_2ViSiO_{0.5}$ units ($M^{Vi}$ units), 75% of $(CH_3)_2SiO$ units (D units) and 8% of $SiO_2$ units (Q units);

filler δ.1: 200 m²/g fumed silica treated with octamethylcyclotetrasiloxane;

filler δ.2: diatomaceous earth with a specific surface area of around 5 m²/g and characterized by its pH in the region of 8 (CELITE® 350);

promoter ε.1: vinyltrimethoxysilane (VTMO);

promoter ε.2: glycidoxypropyltrimethoxysilane (GLYMO); and colorant φ: Graphtol Black BLN carbon black as a 15% dispersion in PDMS oil having a viscosity of 1000 mPa·s.

B/Preparation of the SEA Formulation

1. Premixing

Firstly, a suspension known as a premix was prepared by mixing, at ambient temperature in a reactor with a capacity of around 2 liters equipped with a central stirrer of the "butterfly wing" type (planetary mixer), the following ingredients:
- silicone resin ρ;
- POS α.1;
- silica δ.1 and CELITE® 350 δ.2; and
- colorant φ.

Everything was homogenized for around 50 min at a rotational speed of the stirrer of 200 rpm; the temperature then reached around 80°. The apparatus was then placed under a vacuum of around 25 mm Hg and the stirring speed was increased to 500 rpm for 5 min; in this phase, the temperature reached around 125° C. The equipment was brought back to atmospheric pressure and left to cool. Everything was homogenized for a further 5 to 10 min at around 350 rpm. The premix or paste, which is used in the formulation of the single-component ASE was then collected.

2. SEA Formulation

Brought together in the same mixer as before with stirring were:
- the premix or paste obtained in 1 above;
- promoter ε.1;
- promoter ε.2; and
- POS β.

Next the TMDDO and the platinum catalyst were added at ambient temperature.

Table 1 gives the formulation produced.

TABLE 1

| Reactants (%) | SEA formulation |
|---|---|
| Silicone resin ρ | 19.65 |
| Vinyl-containing POS oil α.1 | 41.933 |
| Filler δ.2: CELITE 350 | 30.87 |

TABLE 1-continued

| Reactants (%) | SEA formulation |
|---|---|
| Filler δ.1: 200 m²/g fumed silica treated with octamethylcyclotetrasiloxane | 1.96 |
| Promoter ε.1: VTMO silane | 0.9 |
| Promoter ε.2: GLYMO silane | 0.9 |
| POS β: ≡Si—H oil | 3.0 |
| TMDDO | 0.287 |
| Karstedt catalyst | 0.01 |
| Colorant | 0.49 |

The product was in the form of a consistent, thixotropic, black elastomer.

C/Evaluations

1/Rheological Characteristics

Boeing S7502 flowability (mm): 100.

2/Crosslinking Kinetics

The crosslinking kinetics of the formulation were evaluated using a MOSANTO MDR 2000 rheometer operating at 150° C. The results are given in Table 2:

TABLE 2

| Parameters measured | Value |
|---|---|
| T50 (seconds) | 70 |
| T90 (seconds) | 90 |
| Max. torque (dN · m) | 4.6 |
| Speed (dN · m/min) | 18 |

These values show that the single-component SEA composition according to the invention crosslinks rapidly at 150° C.

3/Mechanical Properties

The typical values of the mechanical properties and their standards are given in Table 3. These characteristics have been obtained after optimum crosslinking for 1 hour at 150° C.

TABLE 3

| 1 h at 150° C. | Typical values |
|---|---|
| Shore A hardness (Standard ISO R 868, ASTM D2240) | 55 |
| Tensile strength (MPa) (Standard ISO R 37 (H2), ASTM D412) | 4.9 |
| Elongation at break (%) (Standard ISO R 37 (H2), ASTM D412) | 170 |
| Tear strength (N/mm) (Standard ASTM 624 A) | 14 |

4/Adhesion and Heat Stability Characteristics

This was adhesion to test pieces. The test pieces for the adhesion test (standard MNRPS 748-1 mm thick seal) were crosslinked for 1 hour at 150° C., plus 24 hours of (initial) post curing at 23° C. and 50% relative humidity. Heat aging was carried out at 250° for three days for the mixed glass/ stainless steel adhesive bonding. The tests below were carried out on the single-component SEA formulation (Table 4).

TABLE 4

| 1 h at 150° C. | Initially |
|---|---|
| Assembly | Glass/stainless steel |
| Tensile strength (MPa) (Standard MNRPS 748) | 2.7 |
| Cohesion (%) (Standard MNRPS 748) | 100 |

5/Stability

After storing for 6 months the single-component ASE formula was not crosslinked and it was still possible to use it in the desired applications.

The invention claimed is:

1. A single-component silicone elastomer composition which can be crosslinked by polyaddition (hydrosilylation) into self-adhesive state, comprising:
α/ at least one polyorganosiloxane (POS) bearing one or more ethylenically and/or acetylenically sites of unsaturation, {POS having ≡Si-[unsaturation] units};
β/ at least one polyorganosiloxane (POS) bearing ≡Si—H units;
γ/ a catalyst system which comprises:
γ.1 at least one metal catalyst; and
γ.2 at least one crosslinking inhibitor;
δ/ a filler;
ε/ at least one adhesion promoter;
ρ/ at least one POS resin;
λ/ at least one heat stabilizer; and
φ/ optionally, at least one other functional additive;
wherein the crosslinking inhibitor γ.2 is an α-acetylenic alcohol having a boiling point above 250° C. and the molar ratio of the metal of the catalyst to the inhibitor ranges from 1/100 to 1/1000, and
wherein said composition is stable at ambient temperature for several weeks to several months and said composition is capable of retaining, at least during the time required for crosslinking, the shape into which said composition is formed, when said composition is applied to substrates to be joined or sealed.

2. The single-component silicone composition as defined by claim 1, wherein the crosslinking inhibitor γ.2 has the formula:

R—(R')C(OH)—C≡CH    (I)

in which formula:
R is a linear or branched alkyl radical, or an aryl radical; and
R' is H or a linear or branched alkyl radical, or an aryl radical; with the proviso that the R, R' radicals and the carbon atom located at the a position of the triple bond may optionally form a ring member and the total number of carbon atoms contained in R and R' being at least 4.

3. The single-component silicone composition as defined by claim 2, said crosslinking inhibitor γ.2 having the formula (I) in which:
R is a linear or branched alkyl radical, or a phenyl radical;
R' is H or a linear or branched alkyl radical, or a phenyl radical; with the proviso that the total number of carbon atoms contained in R and R' ranges from 9 to 20.

4. The single-component silicone composition as defined by claim 1, said crosslinking inhibitor γ.2 being selected from among the following α-acetylenic alcohols:
3-methyl-1-dodecyn-3-ol;
3,7,11-trimethyl-1-dodecyn-3-ol;
1,1-diphenyl-2-propyn-3-ol;
3-ethyl-6-ethyl-1-nonyn-3-ol; and 3-methyl-1-pentadecyn-3-ol.

5. The single-component silicone composition as defined by claim 1, said catalyst γ.1 comprising a platinum catalyst.

6. The single-component silicone composition as defined by claim 1, comprising:
- α—at least one POS having, per molecule, at least two $C_2$-$C_6$ alkenyl groups bonded to the silicon;
- β—at least one POS having, per molecule, at least two hydrogen atoms bonded to the silicon;
- γ—a catalyst system;
- ε/—a binary adhesion promoter;
- δ/—a mineral and/or microsphere and/or hollow and/or expanded and/or expandable inorganic filler;
- ρ/—at least one POS resin bearing T and/or Q, optionally M and/or D siloxyl units and alkenylated siloxyl units;
- λ/—at least one heat stabilizer; and
- φ/—optionally, at least one other functional additive.

7. The single-component silicone composition as defined by claim 1, crosslinked into self-adhesive state.

8. At least two articles bonded together with the self-adhesive as defined by claim 7.

9. A seal, joint, adhesive bond or coating comprising the self-adhesive as defined by claim 7.

10. An electrical, electronic or automotive component including at least one adhesive seal which comprises the self-adhesive as defined by claim 7.

11. The single-component silicone composition as defined by claim 1, wherein said composition is cross-linkable at a temperature of between 50 and 200° C.

12. The single-component silicone composition as defined by claim 1, wherein said composition is cross-linkable at a temperature of between 80 and 150° C.

13. A single-component silicone elastomer composition which can be crosslinked by polyaddition (hydrosilylation) into self-adhesive state, consisting essentially of:
- α/ at least one polyorganosiloxane (POS) bearing one or more ethylenically and/or acetylenically sites of unsaturation, {POS having ≡Si-[unsaturation] units};
- β/ at least one polyorganosiloxane (POS) bearing ≡Si—H units;
- γ/ a catalyst system which comprises:
  - γ.1 at least one metal catalyst; and
  - γ.2 at least one crosslinking inhibitor;
- δ/ a filler;
- ε/ at least one adhesion promoter;
- ρ/ at least one POS resin;
- λ/ optionally, at least one heat stabilizer; and
- φ/ optionally, at least one other functional additive;

wherein the crosslinking inhibitor γ.2 is an α-acetylenic alcohol having a boiling point above 250° C. and the molar ratio of the metal of the catalyst to the inhibitor ranges from 1/100 to 1/1000, and wherein said composition is stable at ambient temperature for several weeks to several months and said composition is capable of retaining, at least during the time required for crosslinking, the shape into which said composition is formed, when said composition is applied to substrates to be joined or sealed.

* * * * *